(12) United States Patent
Karthik et al.

(10) Patent No.: US 9,584,302 B2
(45) Date of Patent: Feb. 28, 2017

(54) METHOD AND APPARATUS FOR SYNCHRONIZATION OF SLAVE CLOCK TO MASTER CLOCK

(71) Applicant: ANALOG DEVICES GLOBAL, Hamilton (BM)

(72) Inventors: Mohan Perumal Karthik, Bangalore (IN); Sivaramakrishnan Subramanaiam, Bangalore (IN); Praveen Krishna, Karnataka (IN)

(73) Assignee: ANALOG DEVICES GLOBAL, Hamilton (BM)

( * ) Notice: Subject to any disclaimer, the term of this patent is extended or adjusted under 35 U.S.C. 154(b) by 0 days.

(21) Appl. No.: 14/732,253

(22) Filed: Jun. 5, 2015

(65) Prior Publication Data
US 2016/0359610 A1 Dec. 8, 2016

(51) Int. Cl.
*H04L 7/00* (2006.01)
(52) U.S. Cl.
CPC .......... *H04L 7/0012* (2013.01); *H04L 7/0008* (2013.01)
(58) Field of Classification Search
CPC ....... H04L 7/00; H04L 7/0008; H04L 7/0012; H04L 7/0079; H04L 7/06
USPC ......... 375/354, 356, 362, 364; 370/350, 503
See application file for complete search history.

(56) References Cited

U.S. PATENT DOCUMENTS

| 8,384,590 | B2 | 2/2013 | Huang et al. | |
|---|---|---|---|---|
| 8,856,367 | B2 | 10/2014 | Steindl | |
| 8,913,632 | B2 | 12/2014 | Aweya et al. | |
| 8,954,609 | B1* | 2/2015 | Holleman | H04J 3/0667 709/203 |
| 2004/0141526 | A1* | 7/2004 | Balasubramanian | H04J 3/0667 370/503 |
| 2009/0109954 | A1 | 4/2009 | Laulainen et al. | |
| 2011/0161701 | A1* | 6/2011 | Blixt | H03L 1/026 713/320 |
| 2012/0136956 | A1 | 5/2012 | Khoury et al. | |
| 2012/0155497 | A1* | 6/2012 | Lee | H04J 3/0697 370/507 |
| 2015/0071309 | A1* | 3/2015 | Aweya | H04J 3/0682 370/503 |

(Continued)

OTHER PUBLICATIONS

Timing and Synchronization for Time-Sensitive Applicants in Bridged Local Area Networks, IEEE Standard for Local and metropolitan area networks—IEEE Computer Society, Sponsored by the LAN/MAN Standards Committee, IEEE Std 802.1AS™—2011, IEEE New York, NY Mar. 30, 2011, 292 pages.

*Primary Examiner* — Young T Tse
(74) *Attorney, Agent, or Firm* — Patent Capital Group (57) ABSTRACT

Existing synchronization methods can be inefficient in hardware-assisted implementations because of the effects of various jittery events. Thus, a method and an apparatus are provided to synchronize a slave device's clock to a master device's clock for a hardware-assisted implementation. The method can include the receipt of three messages. Time differences are determined based on a time extracted from two of the messages and a time of receipt of a different one of the messages. The slave device's clock can be adjusted based on these time differences. Thus, this method, which can include a dynamic weighted average to compute and implement the synchronization, can synchronize the clock of the slave device to the clock of the master device in a faster time interval.

20 Claims, 9 Drawing Sheets

(56) References Cited

U.S. PATENT DOCUMENTS

| | | | |
|---|---|---|---|
| 2015/0092794 A1* | 4/2015 | Aweya | H04J 3/0667 370/503 |
| 2015/0134764 A1* | 5/2015 | Noebauer | H04L 67/12 709/208 |
| 2015/0139663 A1* | 5/2015 | Lanzone | H04J 3/065 398/154 |
| 2015/0188691 A1* | 7/2015 | Mizuguchi | H04J 3/0667 375/355 |
| 2015/0295669 A1* | 10/2015 | Chapman | H04L 5/0007 370/503 |

* cited by examiner

METHOD AND APPARATUS FOR SYNCHRONIZATION OF SLAVE CLOCK TO MASTER CLOCK

TECHNICAL FIELD

This disclosure pertains to the synchronization of a clock of a slave device to a clock of a master device in a network.

DESCRIPTION OF RELATED ART

A network includes interconnected devices. Some networks include a designated master device and a slave device, where the master device controls the slave device, and the slave device is controlled by the master device. Each of those devices maintains a separate clock that coordinates operations for the device in which the clock is included. These clocks can be implemented in a combination of hardware and software.

For some operations, particularly those pertaining to audio and video streaming, the clock of the slave device is synchronized to the clock of the master device. Different industry standards can be used for such a synchronization. One such standard is generalized Precision Time Protocol (gPTP) discussed in IEEE Std. 802.1AS-2011. There are several synchronization methods for gPTP. However, these methods have drawbacks, such as slower synchronization.

BRIEF DESCRIPTION OF EXAMPLE EMBODIMENTS

In one embodiment, an apparatus is provided to synchronize a slave device. The apparatus includes at least one interface that receives a first message, a second message, and a third message. The apparatus also includes at least one processor that extracts a first time from the first message, determines a second time that indicates a reception of the second message, and extracts a third time from the third message. The at least one processor determines a first difference between the first time and the third time and determines a second difference between the second time and the first time.

In some embodiments, the at least one interface receives a fourth message prior to the first message, and the at least one processor determines a fourth time that indicates a reception of the fourth message. The at least one processor determines a third difference, based on the first message and the fourth message, and adjusts a time of a clock of the slave device, based on the third difference. The at least one processor adjusts a frequency of a clock of the slave device, based on the first difference and the second difference. The at least one processor determines a rate ratio based on the first difference, the second difference, and a previous rate ratio, and adjusts a frequency of a clock of the slave device, based on the rate ratio.

In some implementations, the at least one processor determines a rate ratio, based on the second difference, and adjusts a frequency of a clock of the slave device, based on the rate ratio. The rate ratio is decreased if the second difference is greater than zero. The rate ratio is increased if the second difference is less than zero.

DETAILED DESCRIPTION

Slow synchronization between a clock of a slave device and a clock of a master device can create real-world problems. For example, some automotive systems send audio alerts over a network to a driver. For safety purposes, these alerts should be available as soon as the driver starts the car. If the playback of these alerts is delayed by a delayed synchronization, the driver is at risk of not getting a critical alert in a timely manner.

In addition, industry requires these automotive systems be capable of playing audio within a defined time of system start-up. Conventional systems avoid this restriction by attempting to play a noisy alert to the driver before synchronization. However, without synchronization, this alert is not guaranteed to play.

Some embodiments discussed in this disclosure enable a clock of a slave device to rapidly match a speed of a clock of a master device (i.e., a relative time difference). Some embodiments also enable a reduction in an absolute time difference between the clock of the master device and the clock of the slave device. Thus, in an automotive system, clean, guaranteed audio can be delivered. Further, the chances of a loss of the audio can be reduced, and the driver's safety can be improved by a faster synchronization.

Before turning to specific activities proposed by the present disclosure, certain foundational information is provided to assist the audience in understanding fundamental problems encountered in slave synchronization.

As discussed, slave device clocks can be implemented in a combination of hardware and software. Further, a hardware block of a slave device partially can maintain a running local clock. This clock then can be manipulated by software to be synchronized to a gPTP domain clock.

A slave device hardware block typically manipulates the clock with adjustment features such as a coarse adjust and a fine adjust. The coarse and fine adjusts typically implement in hardware IEEE 802.1AS features. While IEEE 802.1AS does not detail a specific method of implementation, there is a generally accepted convention. Specifically, the Precision Time Protocol (PTP) can be implemented in hardware having a clock and a counter incremented on each tick of the clock. On each clock tick, a specific value signifying the elapsed time is added to the counter. For example, if the clock operates at a frequency of 50 MHz, then the value 20 is added to the counter on each clock tick, signifying that 20 ns has elapsed.

The coarse adjust adds or subtracts a specific offset from the clock to synchronize the clock with a master device. This addition or subtraction is typically performed at the beginning of a synchronization procedure.

In contrast, the previously mentioned fine adjust manipulates a frequency of the local clock (i.e., increasing or decreasing) to syntonize the local clock with the master device. Specifically, the fine adjust changes the frequency with which the previously mentioned specific value (i.e., 20) is added to the counter. So, if the slave clock is to be slowed by 50% to match the clock of the master device, 20 ns is added to the counter every 1.5 clock ticks rather than every tick. Thus, the coarse adjust provides an instant adjustment at the cost of continuity, whereas the fine adjust provides a continuous, gradual adjustment.

In the gPTP time synchronization protocol, a designated grandmaster periodically transmits two messages, Sync and FollowUp, to a slave device. In a synchronization operation, the master device accurately records as a timestamp the time at which the master device sent out the Sync message to the slave device. The Sync message is generally delayed on its way to the slave device by a neighbor propagation delay.

The slave device, on receiving the delayed Sync message, immediately records the time of receipt. This time of receipt is in reference to a clock of the slave device and is recorded as timestamp syncEventIngressTimestamp.

The master device later sends to the slave device a FollowUp message. This FollowUp message contains a timestamp preciseOriginTimestamp indicating a time at which the master device sent the Sync message.

In such a system, the local time at the slave device can be defined by Equation 1, and the remote time (i.e., the local time at the master device) can be defined by Equation 2.

$$localTime[i]=SyncEventIngressTimestamp[i] \qquad \text{Equation 1}$$

$$remoteTime[i]=preciseOriginTimestamp[i] \qquad \text{Equation 2}$$

Accordingly, the absolute time difference between the master device and the slave device at any time i can be derived from Equation 3:

$$absoluteTimeDiff=localTime[i]-remoteTime[i]-\\ neighborPropDelay \qquad \text{Equation 3}$$

where neighborPropDelay is the neighbor propagation delay and is calculated using a sub-protocol of the IEEE 802.1AS standard called the pdelay protocol. The pdelay protocol is described in detail in section 11.2.15 and 11.2.16 of the IEEE 802.1AS:2011 specification.

As opposed to the absolute time difference, the relative time difference between the master and slave devices indicates how fast or slow the slave device is relative to the master device during the previous synchronization interval. The relative time difference between the master device and the slave device can be defined by Equation 4.

$$relativeTimeDiff=(localTime[i+1]-localTime[i])-\\ (remoteTime[i+1]-remoteTime[i]) \qquad \text{Equation 4}$$

The ratio between the average frequencies (accommodating for intermediate clock drifts) of the slave device and the master device for the duration of a particular (e.g., the i-th) synchronization interval, termed syncInterval, is defined as a current rate ratio. The immediate current rate ratio, termed currRateRatio, can be calculated as shown in Equation 5.

$$currRateRatio[i] = \frac{(remoteTime[i+1] - remoteTime[i])}{(localTime[i+1] - localTime[i])} \qquad \text{Equation 5}$$

The time synchronization protocol aims to reduce the absolute time difference to zero and to maintain the absolute time difference as close to zero as possible amidst possible jitter.

One method of synchronization is a direct application of the coarse adjust. This method involves coarse adjusting the slave device's time with the time difference every time a Sync and Follow-Up message is received. A drawback to this method is the coarse adjustment results in ragged jumps in time for the slave device. These ragged jumps result in an uneven time representation that makes many applications based on the gPTP time (such as audiovisual (AN) playback) very uneven and jittery.

Another method of synchronization is a direct application of the current rate ratio as the grandmaster rate ratio. The grandmaster rate ratio is the ratio of the clock frequencies between the slave and the grandmaster. Specifically, as illustrated in Equation 6, the current rate ratio is directly applied as a fine adjustment to the hardware block.

$$gmRateRatio[i]=currRateRatio[i] \qquad \text{Equation 6}$$

This direct application of the current rate ratio has several drawbacks relating to jitter in clock measurement. The first such drawback is in the clock accuracy and drift. The current rate ratio fluctuates based on the immediate clock drift, leading to jitter.

The second such drawback is in the neighbour propagation delay. If the propagation delay varies (e.g., has jitter), then the slave device will receive packets with varying delays, and these delays can cause variations in the local time. These delays thus play a significant part in the absolute time difference calculation (see Eq. 3). Variations in the local time can also induce errors in the calculation of the current rate ratio. Thus, when using conventional methods to synchronize the slave device to the master device, the system can tolerate only very low levels of jitter (e.g., variations in delay) before losing synchronization.

A third drawback is in the syncInterval. The current rate ratio is calculated for the previous syncInterval. When a calculated current rate ratio is at a value of 0.9, that value means the slave device's clock is 10% faster than the master device's clock during the previous syncInterval. When the syncInterval fluctuates (e.g., inherently, because messages are formed and sent in software), the non-constant interval duration prevents calculated values from being applied directly for subsequent intervals.

Finally, a fourth drawback is in the frequency adjust time offset. There will always be a time offset from when the ratio is calculated at the time of receipt of the Sync message to when the current rate ratio is applied to the hardware block. This offset will cause a jitter in the measurement of the clock. For example, consider the following parameters:

syncInterval=125 ms (idealized)
propDelay=0 ns (idealized)
preciseOriginTimestamp[0]=125 ms
syncEventIngressTimestamp[0]=137.5 ms
preciseOriginTimestamp[1]=250 ms
syncEventIngressTimestamp[1]=275 ms These parameters return a current rate ratio of $$currRateRatio = \frac{(250-125)}{(275-137.5)} = \frac{125}{137.5} = 0.91$$

Now assume the software takes 20 ms for calculations and to set this frequency in hardware. Assuming an ideal hardware gPTP implementation that changes the frequency instantly, the new frequency has not been valid for the entire duration of the syncInterval but rather for syncInterval—20 ms. This difference in duration causes the next grandmaster rate ratio calculation to be incorrect.

A simple or moving average implementation solves many of the problems in the direct application approach. By implementing an averaging, jitter issues can be resolved and smoothened. The drawback with a generic averaging is that, by smoothening the synchronization, the slave device might take more time to achieve the synchronization.

One variation of this averaging is a simple average for the grandmaster rate ratio defined by Eq. 7.

$$gmRateRatio[i] = \frac{\sum_{i=1}^{N} currRateRatio[i]}{N} \quad \text{Equation 7}$$

where N is the total number of current rate ratios calculated.

Another variation of the averaging calculation is a moving average as defined for the grandmaster rate ratio by Eq. 8.

$$gmRateRatio[i] = \frac{\sum_{i=(N-M)}^{N} currRateRatio[i]}{M} \quad \text{Equation 8}$$

where N is the total number of current rate ratios calculated, and M is a moving window size.

Another implementation is a simple weighted average. A simple weighted average is marginally better than the simple moving average. By implementing a weighted average, the jitter is smoothened even further. A drawback of the weighted average is that the weighting parameters still do not respond dynamically to real-time changes and, hence, unnecessarily delay the time required to achieve a synchronization.

A simple weighted average can be implemented for the grandmaster rate ratio as follows in Eq. 9.

$$gmRateRatio[i] = \frac{((WEIGHT-1)*gmRateRatio[i-1]) + (currRateRatio[i])}{WEIGHT} \quad \text{Equation 9}$$

where WEIGHT is an arbitrary constant that modifies the weighted average as acceptable for the system.

Figure 1:
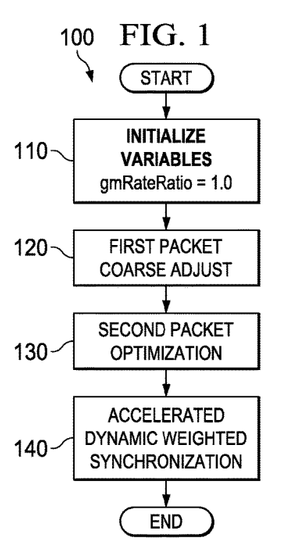
FIG. 1 illustrates a flowchart of an overall flow for a slave synchronization technique in accordance with one embodiment.

An embodiment of a synchronization process includes three phases, each of which are individually described below. An embodiment of the overall slave synchronization flow 100 is shown in FIG. 1. The flow begins at 110 in which variables are initialized. For example, the grandmaster rate ratio variable is initialized to 1.0. The flow then proceeds to 120, at which the first packet coarse adjustment is performed. The first packet coarse adjustment is discussed in detail later. At 130, a second packet optimization is performed. The second packet optimization is also discussed in detail later. Finally, an accelerated dynamic weighted synchronization is performed at 140. The accelerated dynamic weighted synchronization is similarly discussed in detail later. The process then ends.

Figure 2:
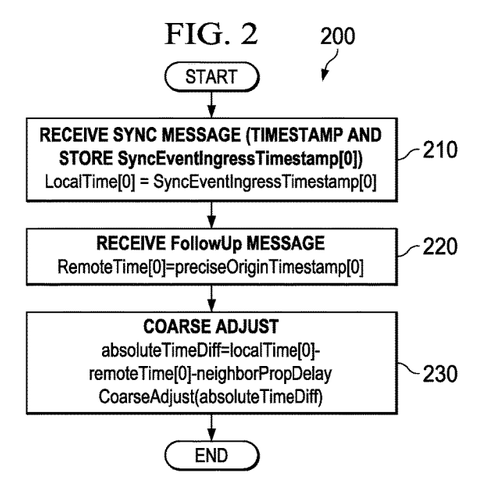
FIG. 2 illustrates a flowchart of a first packet coarse adjustment for a slave synchronization technique in accordance with one embodiment.

The flow of the first packet coarse adjustment 120 is illustrated in FIG. 2 as 200. The flow begins at 210, in which a slave device receives from a master device a first Sync message. Upon receiving the first Sync message, the slave device records the time at which the first Sync message was received in reference to a clock of the slave device. The slave device records this time (e.g., timestamps the message) as timestamp SyncEventIngressTimestamp[0] and sets local time LocalTime[0] equal to SyncEventIngressTimestamp[0].

At 220, the slave device receives from the master device a first FollowUp message. The FollowUp message includes a timestamp preciseOriginTimestamp[0] recorded by the master device indicating the time at the master device when the master device sent out the first Sync message. Upon receiving the first FollowUp message, a processor of the slave device extracts the timestamp preciseOriginTimestamp from the FollowUp message and uses it. Specifically, the slave device sets the remote time RemoteTime[0] equal to the timestamp preciseOriginTimestamp[0].

At 230, the slave device determines an absolute time difference and performs a coarse adjustment. Specifically, the slave device determines the absolute time difference by subtracting from the local time recorded in 210 the remote time recorded in 220 and the neighbor propagation delay. The slave device then applies this difference in a coarse adjustment.

Figure 3:
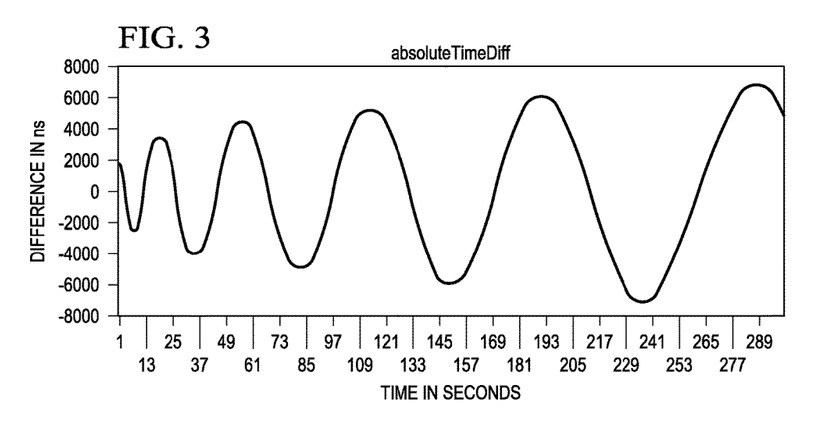
FIG. 3 illustrates an absolute time difference using a simple averaging in accordance with a conventional implementation.

In a comparative example, a conventional solution of simple averaging (refer to Eq. 7) for the grandmaster rate ratio results in synchronization as shown in FIG. 3. As can be noticed, with the simple averaging, the absolute time difference spirals out of control. This spiraling is primarily due to the effects of various jitters.

In contrast, the proposed process can include a dynamic weighted averaging implemented for the grandmaster rate ratio as shown in Eq. 10.

$$gmRateRatio[i]=(\alpha \times currRateRatio[i])+((1-\alpha) \times gmRateRatio[i-1]) \quad \text{Equation 10}$$

where $$\alpha = \begin{cases} \frac{\log(\text{MIN\_ACCEPTABLE\_OFFSET})}{\log(|absoluteTimeDiff|)}; \\ \text{if } |absoluteTimeDiff| > \text{Min\_ACCETABLE\_OFFSET} \\ 1; \text{if } |absoluteTimeDiff| < \text{Min\_ACCETABLE\_OFFSET} \end{cases} \quad \text{Equation 11}$$

The value for offset MIN_ACCEPTABLE_OFFSET can be determined empirically. For example, a value of 50 ns for the offset MIN_ACCEPTABLE_OFFSET was experimentally determined to give desirable results.

Figure 4:
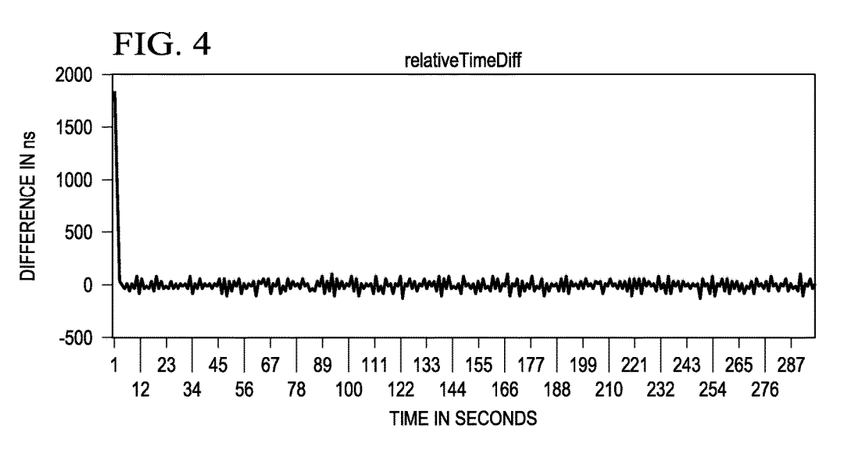
FIG. 4 illustrates a relative time difference using a dynamic weighted average in accordance with one embodiment.
Figure 5:
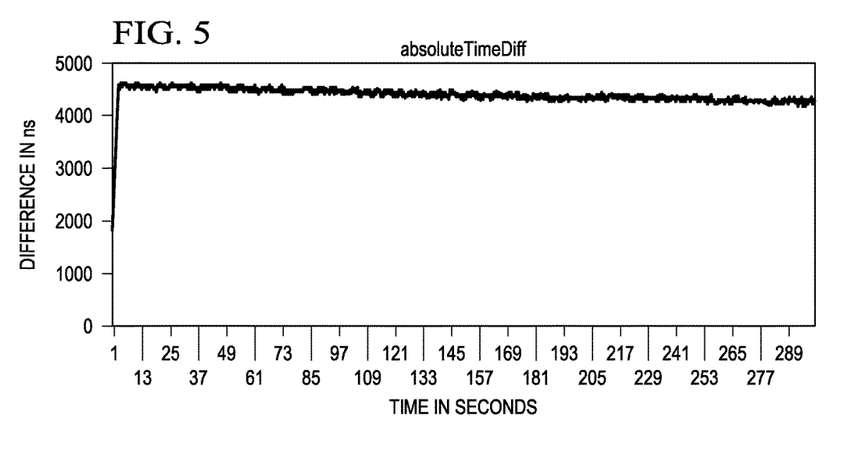
FIG. 5 illustrates an absolute time difference using a dynamic weighted averaging in accordance with one embodiment.

This averaging results in synchronizing the slave device very quickly with the master device as can be noticed in FIGS. 4-5. In particular, as can be noticed in FIG. 4, the proposed method quickly locks the relative time difference. This locking ensures the absolute time difference is maintained at a constant level, as illustrated in FIG. 5. The process can keep track of this value in software and use it accordingly in dependent protocols, or the process can use another method that would also bring the absolute difference to approximately 0.

As suggested previously, the slave device performs a coarse adjustment during a first sync packet with Eq. 12.

$$\text{coarseAdjust} = \text{localTime}[0] - \text{remoteTime}[0] - \text{neighborPropDelay} \quad \text{Equation 12}$$

Thus, the local time LocalTime[0] value is not valid and cannot be used for ratio calculations. This invalidity implies that the current rate ratio currRateRatio[0] cannot be calculated, and the first reliable calculations start no earlier than currRateRatio[1] (refer to Eq. 5).

Similarly, the relative time difference remains uncalculated for the first sync packet.

Figure 6:
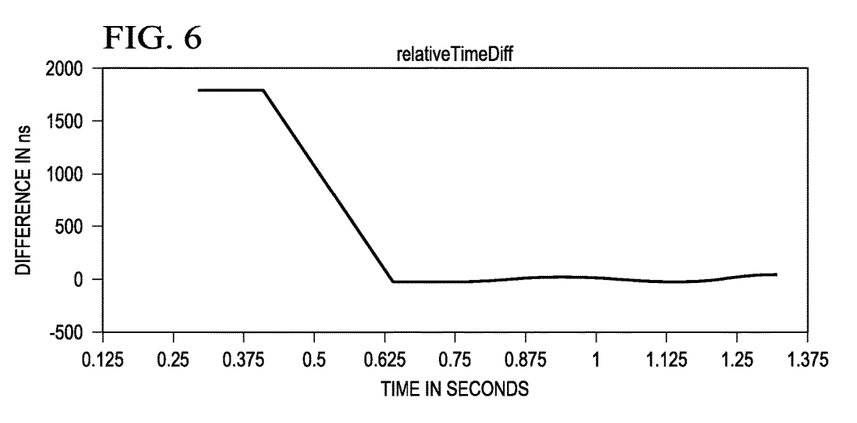
FIG. 6 illustrates a relative time difference without second packet optimization, in accordance with a conventional implementation.
Figure 7:
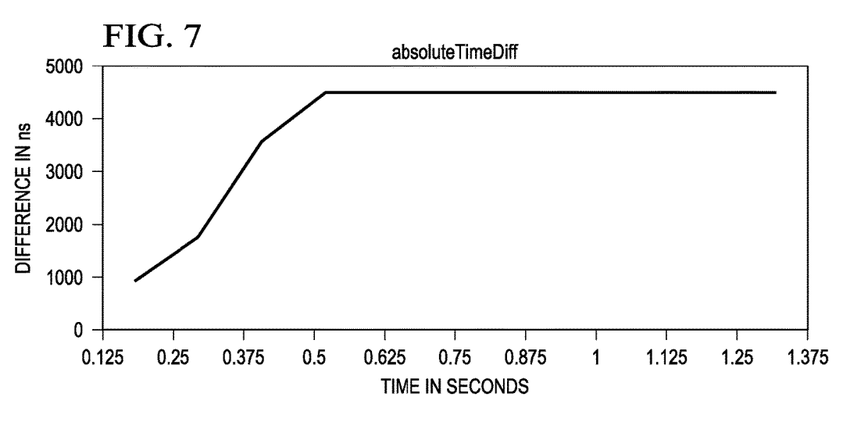
FIG. 7 illustrates an absolute time difference without second packet optimization, in accordance with a conventional implementation.

Further, conventional methods use third packet optimization, because those methods assume the time will be stable only by then. The time difference thus remains constant for the second and the third sync packet. This constant time difference also causes the absolute time difference to rise unchecked during the first two isyncIntervals, as shown in FIGS. 6-7.

After the coarse adjusting (during the first sync packet reception described previously), the local time LocalTime[0] can reliably be assumed to be substantially equivalent to the remote time remoteTime[0]. Thus, the calculations can be optimized with the second packet optimized ratio calculation shown for the current rate ratio in Eq. 13.

$$\text{currRateRatio}[0] = \frac{(\text{remoteTime}[1] - \text{remoteTime}[0])}{(\text{localTime}[1] - \text{remoteTime}[0])} \quad \text{Equation 13}$$

This second packet optimization has a potential advantage of not letting the frequency continually drift during the first two syncIntervals and thus achieving a synchronization within a very short interval.

Figure 8:
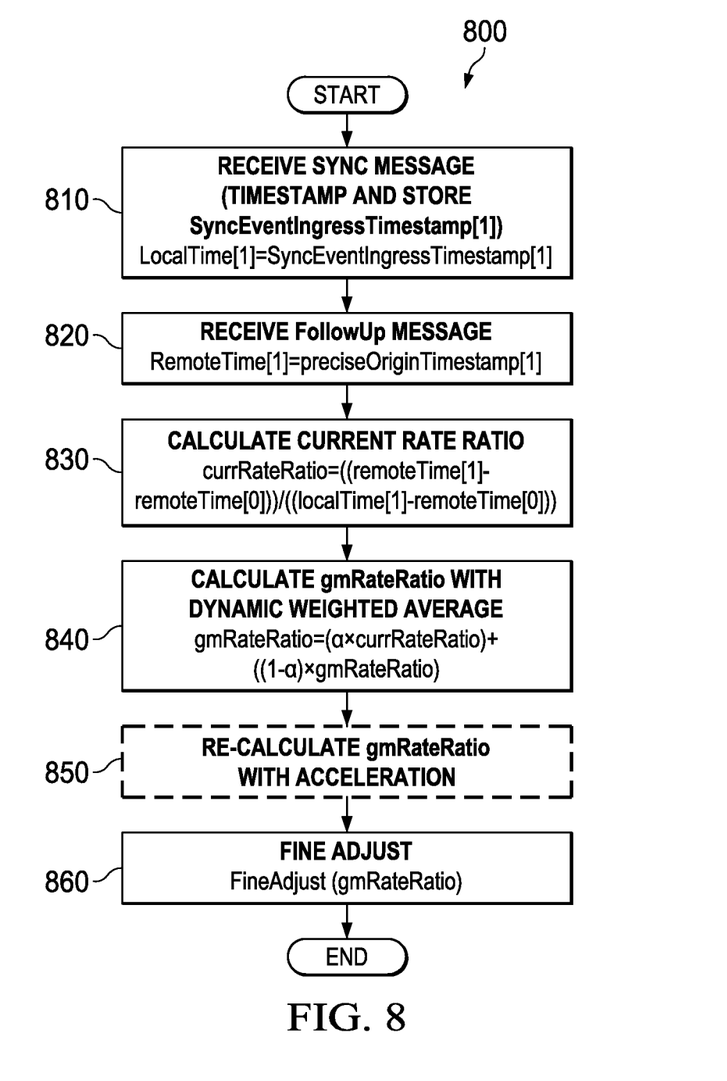
FIG. 8 illustrates a flowchart of a second packet optimization for a slave synchronization technique in accordance with one embodiment.

The second optimization is implemented with the workflow 800 shown in FIG. 8. At 810, the slave device receives from the master device a second Sync message at the second syncInterval. Upon receiving the second Sync message, the slave device records the time at which the second Sync message was received in reference to a clock of the slave device. The slave device records this time (e.g., timestamps the message) as SyncEventIngressTimestamp[1] and sets local time localtime[1] equal to timestamp SyncEventIngressTimestamp[1].

At 820, the slave device receives from the master device a second FollowUp message. The second FollowUp message includes a timestamp preciseOriginTimestamp[1] recorded by the master device indicating the time at the master device when the master device sent out the second Sync message. Upon receiving the second FollowUp message, a processor of the slave device extracts the preciseOriginTimestamp from the second FollowUp message and uses it. Specifically, the slave device sets the remote time RemoteTime[1] equal to the timestamp preciseOriginTimestamp[1].

At 830, the slave device calculates a current rate ratio. The slave device calculates a first difference between the remote time RemoteTime[1] set in 820 and the remote time RemoteTime[0] set in 220. The slave device also calculates a second difference between the local time LocalTime[1] set in 810 and the remote time RemoteTime[0] set in 220.

Because local time LocalTime[0] is the first time the slave device receives a sync packet from the master device, the slave merely is initializing synchronization at that time. Accordingly, the slave device's clock might be very far off at that time compared to the clock of the master device. To address this discrepancy, a coarse adjustment can be performed to correct the slave time. Thus, since the local time LocalTime[0] initially might be wrong, the local time LocalTime[0] is corrected to be equal to remote time RemoteTime[0] by the coarse adjustment. As discussed later, for the second packet, the remote time RemoteTime[0] can be used instead of the local time LocalTime[0].

The slave device then determines the current rate ratio by dividing the first difference by the second difference.

At 840, the slave device determines a grandmaster rate ratio with a dynamic weighted average, as shown in Eq. 10. In particular, the slave device determines the grandmaster rate ratio based on the current rate ratio and a previous grandmaster rate ratio.

At 850, the slave device optionally recalculates the grandmaster rate ratio with acceleration. This recalculation is discussed in more detail later.

At 860, the slave device performs a fine adjustment based on the grandmaster rate ratio.

Figure 9:
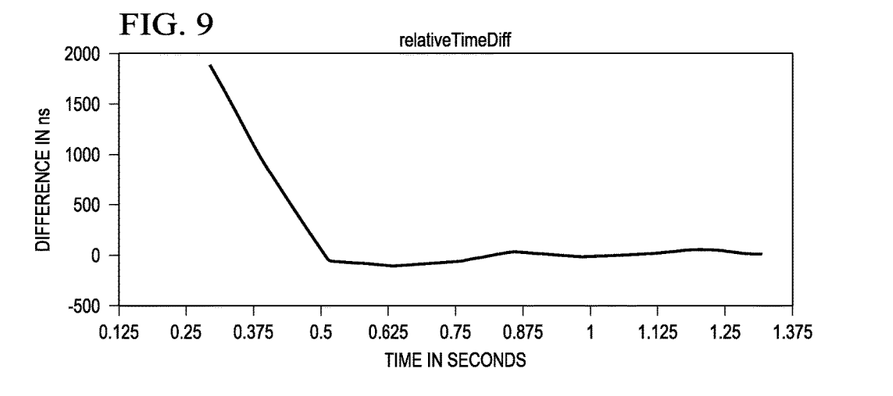
FIG. 9 illustrates a relative time difference with a second packet optimization for a slave synchronization technique in accordance with one embodiment.
Figure 10:
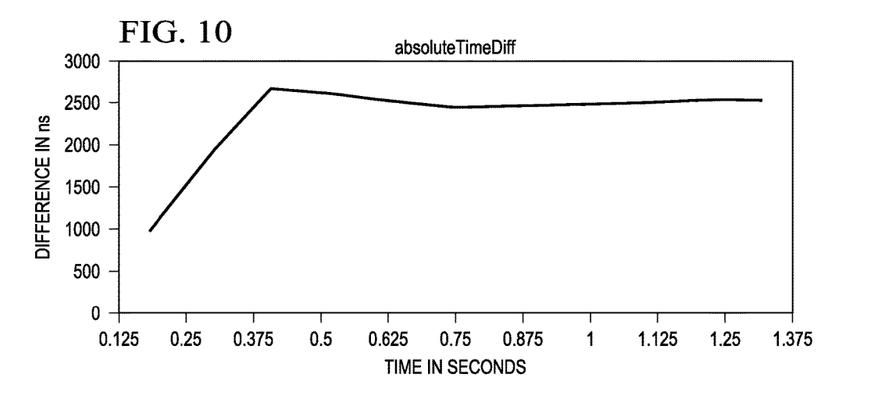
FIG. 10 illustrates an absolute time difference with a second packet optimization for a slave synchronization technique in accordance with one embodiment.

With the second packet optimization, the synchronization can look as shown in FIGS. 9-10. The differences seen relative to FIGS. 6-7 are that the frequency (i.e., the relative time difference) is locked in a shorter time duration (almost achieving the 0.5 s mark), and the absolute time difference is reduced because of the faster lock.

In the above two methods, the implementation sometimes is constrained to track the absolute time difference in software. This constraint is typically because, once the frequency is locked, the absolute time difference remains consistent without any change. For synchronization, a series of coarse and fine adjustments are required which would cause unacceptable jitter in the clock.

Previous FIGS. 4-5 describe the synchronization behavior without this method.

Figure 11:
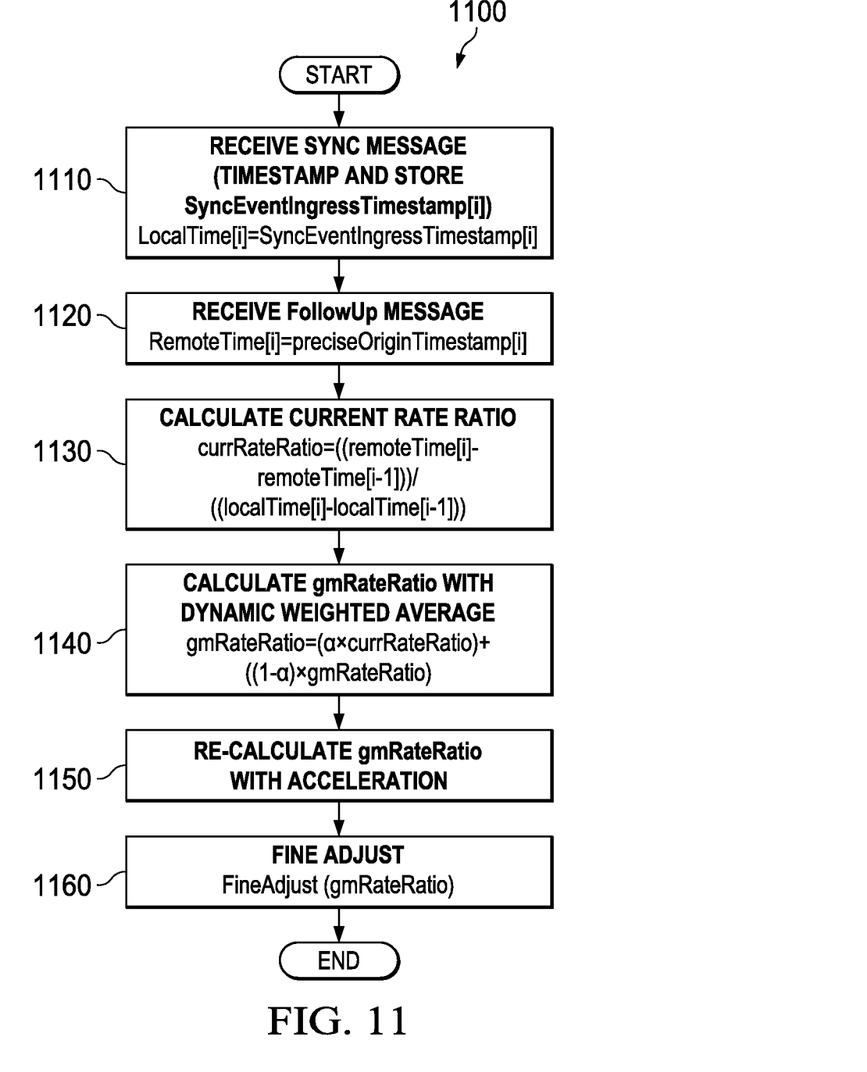
FIG. 11 illustrates a flowchart of an accelerated dynamic weighted averaging for a slave synchronization technique in accordance with one embodiment.

The implementation procedure for a hardware absolute time lock workflow 1100 is shown in FIG. 11. At 1110, the slave device receives from the master device a second Sync message at the second syncInterval. Upon receiving the second Sync message, the slave device records the time at which the second Sync message was received in reference to a clock of the slave device. The slave device records this time (e.g., timestamps the Sync message) as timestamp SyncEventIngressTimestamp[i] and sets local time localtime[i] equal to the timestamp SyncEventIngressTimestamp[i].

At 1120, the slave device receives from the master device a second FollowUp message. The second FollowUp message includes a timestamp preciseOriginTimestamp[i] recorded by the master device indicating the time at the master device when the master device sent out the second Sync message. Upon receiving the second FollowUp message, a processor of the slave device extracts the timestamp preciseOriginTimestamp from the second FollowUp message and uses it. Specifically, the slave device sets remote time RemoteTime[i] equal to timestamp preciseOriginTimestamp[i].

At 1130, the slave device calculates the current rate ratio. The slave device calculates a first difference between remote time RemoteTime[i] set in 1120 and a previous remote time RemoteTime[i−1]. For example, the slave device calculates the first difference between the remote time RemoteTime[1] and the remote time RemoteTime[0] set in 220. The slave device also calculates a second difference between a local time LocalTime[i] set in 1110 and a local time LocalTime[i−1]. For example, the slave device calculates the second difference between the local time LocalTime[1] set in 1110 and the local time LocalTime[0] set in 210. The slave device then determines the current rate ratio by dividing the first difference by the second difference.

At 1140, the slave device determines a grandmaster rate ratio with a dynamic weighted average, as shown in Eq. 10. In particular, the slave device bases the grandmaster rate ratio on the current rate ratio and a previous grandmaster rate ratio.

At 1150, the slave device recalculates a grandmaster rate ratio with acceleration, as shown in Eq. 14.

$$gmRateRatio = \begin{cases} \dfrac{gmRateRatio}{\gamma}; & \text{if } absoluteTimeDiff > 0 \\ gmRateRatio \times \gamma; & \\ \text{if } absoluteTimeDiff < 0 \end{cases} \quad \text{Equation 14}$$

where $$\gamma = 1 + \frac{(|absoluteTimeDiff|)}{SYNC\_ACCEL\_CONST}, \quad \text{Equation 15}$$

and the grandmaster rate ratio gmRateRatio is defined in Equation 10.

At 1160, the slave device performs a fine adjustment based on the grandmaster rate ratio.

In one implementation, the value of SYNC_ACCEL_CONST was set to 200,000,000. This value can be a configurable parameter for each implementation and can be derived from the aggressiveness of the acceleration and the stability of the jitter factors. The more unstable the jitter is, the more this constant has to be increased, thus making the acceleration less aggressive.

Figure 12:
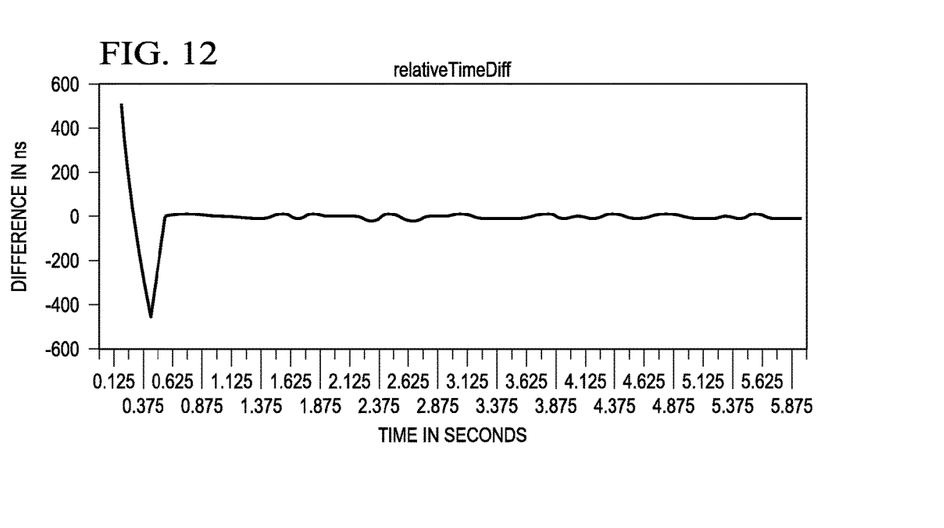
FIG. 12 illustrates a relative time difference with an accelerated ratio calculation for a slave synchronization technique in accordance with one embodiment.
Figure 13:
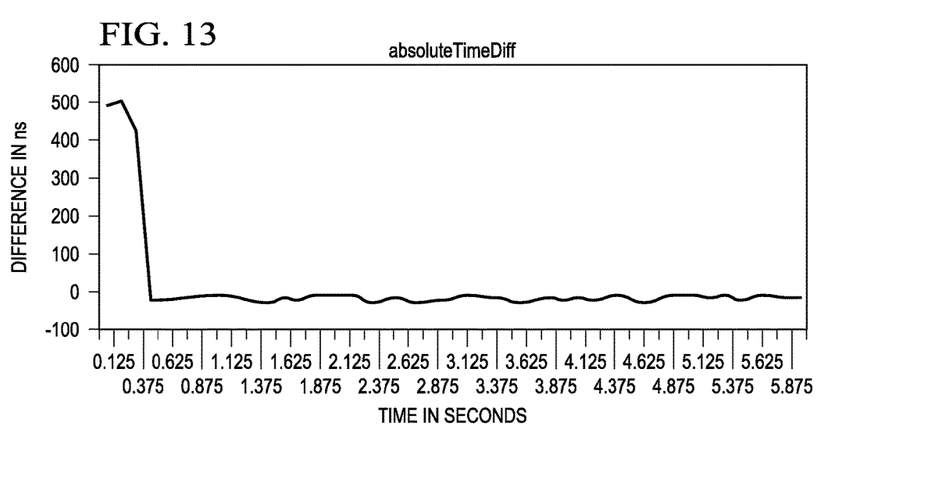
FIG. 13 illustrates an absolute time difference with an accelerated ratio calculation for a slave synchronization technique in accordance with one embodiment.

This locking results in synchronization as shown in FIGS. 12-13. As can be seen from these figures, both the relative time difference (FIG. 12) and the absolute time difference (FIG. 13) can be locked directly in hardware, thus potentially removing an inefficient measurement of the same in software. Also, the lock can be achieved in a very short interval of close to 0.4 s. This locking can be made more aggressive depending on the various jitters that affect the system.

Figure 14:
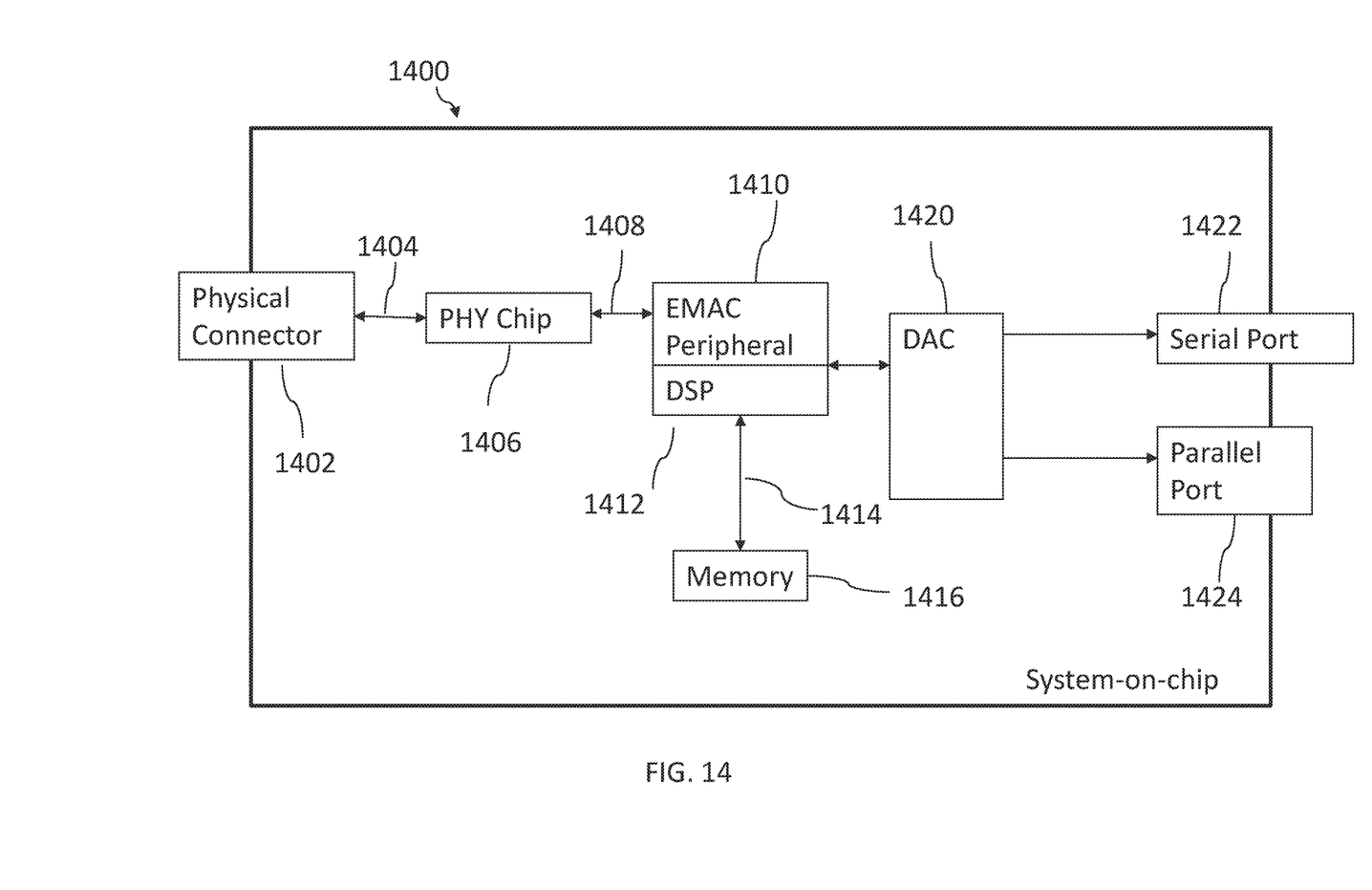
FIG. 14 illustrates a block diagram of a system-on-chip in accordance with one embodiment.

FIG. 14 illustrates a block diagram of a system-on-chip 1400 in accordance with one embodiment. The system includes a physical connector 1402, PCB wiring 1404, a PHY chip 1406, an interface 1408, an Ethernet Media Access Controller (EMAC) peripheral 1410 on a digital signal processor (DSP) 1412, an interface 1414, a memory 1416, a digital-to-analog converter (DAC) 1420, a serial port 1422, and a parallel port 1424. In some embodiments, additional components can be present, and some components might not be present, such as the DAC 1420, the serial port 1422, and the parallel port 1424.

The physical connector 1402 can be, for example, a registered jack, such as an RJ45 connector. The physical connector 1402 is an example of an externally interfacing means.

The PCB wiring 1404 is the wiring on a circuit board on which the system-on-chip is mounted. The circuit board can be single sided, double sided, or multi-layer.

The PHY chip 1406 is a chip that implements physical layer functions of the Open Systems Interconnection (OSI) model. The physical layer is the lowest layer of the OSI model. In some embodiments, the PHY chip 1406 performs operations of the above-defined algorithms. For example, the PHY chip 1406 can determine a reception time (such as in 210, 220, 810, 820, 1110, and 1120) and give details of the reception time to, e.g., EMAC 1410 or DSP 1412. In those cases, the EMAC 1410 or the DSP 1412 might not record the timestamp but can instead take the details directly from the PHY chip 1406. In some embodiments, the PHY chip is a processing means.

The interface 1408 connects the PHY chip 1406 to a Media Access Control (MAC) block. For example, the interface 1408 can be a Media Independent Interface (MII) or a Reduced Media Independent Interface (RMII). In addition, the interface 1408 can also be Serial Gigabit Media Independent Interface (SGMII), a gigabit interface converter (GBIC), or any other suitable interface.

The EMAC peripheral 1410 operates at the second layer of the OSI model, the data link layer.

The DSP 1412 can be implemented by an off-the-shelf DSP or by a custom DSP. The DSP can have a single core or multiple cores. The DSP need not run an operating system, although in some implementations, the DSP does run an operating system. The DSP typically uses fixed-point arithmetic, though in some embodiments, the DSP can use floating-point arithmetic. The DSP 1412 is an example of a processing means. The processing means can also include PHY chip 1406 and EMAC peripheral 1410.

The interface 1414 copies data from the DSP 1412 to memory 1416. The interface 1414 can implement direct memory access (DMA). For example, the interface 1414 can conform to a Peripheral Component Interconnect (PCI) architecture or I/O Acceleration Technology or any other suitable technology.

The memory 1416 can be implemented as a static random-access memory (SRAM). The memory 1416 can also be implemented as a dynamic random-access memory. The memory 1416 is an example of a storing means.

In particular embodiments, such as when the memory 1416 is implemented as an SRAM, the memory 1416 can reside within the DSP 1412 (Level 1). In other embodiments, the memory 1416 resides off the DSP 1412 (Level 2 or Level 3). When the memory 1416 resides off the DSP 1412, a cache of the DSP 1412 cooperates with the memory 1416.

The digital-to-analog converter (DAC) 1420 converts digital data to analog signals. For example, the DAC 1420 can convert digital data to audio content to be transmitted over serial port 1422. In addition or alternatively, the DAC 1420 can convert digital data to video data to be transmitted over parallel port 1424. The DAC 1420 is an example of a converting means.

The serial port 1422 receives, for example, audio content from the DAC 1420. The serial port 1422 outputs the audio content to, for example, a pair of speakers. In other embodiments, the serial port 1422 outputs the audio content to a pair of headphones.

The parallel port 1424 receives, for example, video data from the DAC 1420. The parallel port 1422 outputs the video content to, for example, a display, such as a television. In other embodiments, the parallel port 1422 outputs the video content to a different display, such as a computer monitor.

Serial port 1422 and parallel port 1424 are examples of outputting means.

In some implementations, the DSP 1412 generally processes only PTP packets. Because PTP packets are mostly control packets, the DSP 1412 reads the memory 1416 and deciphers the packets and implements the above-defined algorithms.

In other operations, the DSP 1412 processes audio and/or video packets. In such operations, the DSP 1412 copies the audio and/or video packets to another location in the memory 1416. The DSP 1412 also invokes a relevant peripheral, such as serial port 1422 or parallel port 1424. In addition, the DSP 1412 transmits data of the audio and/or video packets to DAC 1420. The DAC 1420 then converts the data to analog signals. In some embodiments, the DAC 1420 then transmits the analog signals to serial port 1422 or parallel port 1424.

Figure 15:
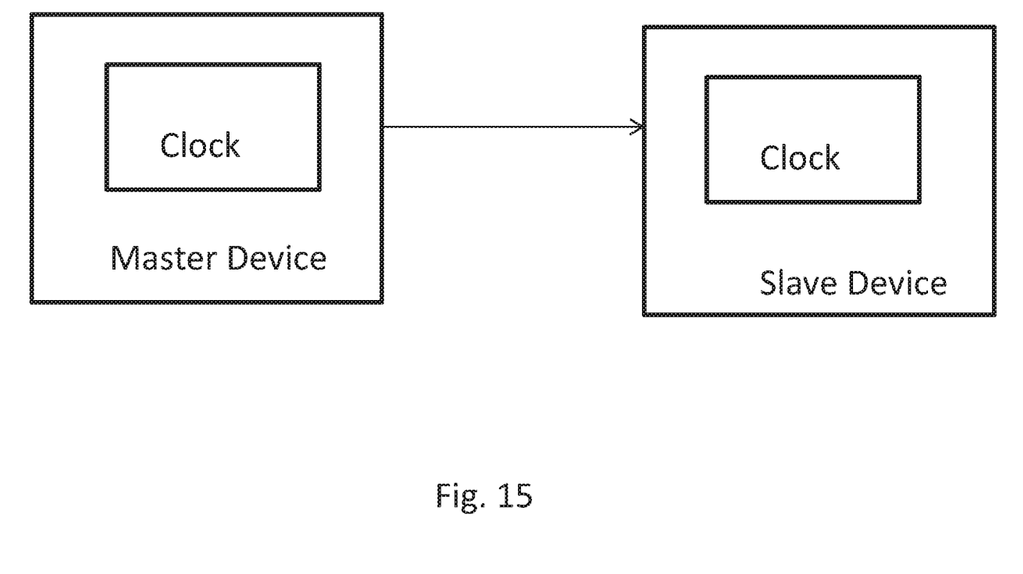
FIG. 15 illustrates a block diagram of a network.

FIG. 15 illustrates a block diagram of a network. The network includes a designated master device and a slave device. The master device controls the slave device, and the slave device is controlled by the master device. The master device includes a clock that coordinates operations for the master device. The slave device includes a clock that coordinates operations for the slave device.

The activities discussed above are applicable to any integrated circuit that involves slave synchronization, particularly those circuits that can execute specialized software programs or algorithms. One specific use case for gPtP and synchronization is in gPTP-enabled network switches/bridges. Further, certain embodiments relate to multi-DSP signal processing, floating point processing, signal/control processing, fixed-function processing, microcontroller applications, etc.

The features discussed in this disclosure can be applied to synchronization in medical systems, scientific or medical instrumentation (especially instrumentation that is highly precise), wireless and wired communications, defense applications (such as radar and in making sure messages relayed across multiple devices arrive in time and are synchronized in time), and industrial process control (e.g., where sensors should be synchronized to the same time so that their collected data is meaningful). The features are also applicable to audio and video equipment, current sensing, and other digital-processing-based systems.

Some embodiments of this disclosure can be used in applications that use precise time synchronization in connected networks. Such applications include media playback with, e.g., Ethernet audio video bridging, and synchronization of control information in, e.g., defense systems, industrial automation system, and medical systems.

Certain embodiments of this disclosure can be provisioned in digital signal processing technologies for medical imaging, patient monitoring, and home healthcare. This provisioning can include pulmonary monitors, accelerometers, heart rate monitors, pacemakers, etc. Other applications involve automotive technologies for safety systems (e.g., stability control systems, driver assistance systems, braking systems, etc.). Other automotive technologies include infotainment (e.g., to adjust the clocks of all the devices on the automobile so that the audio/video can be played without any noise) and interior applications. Furthermore, powertrain systems (for example, in hybrid and electric vehicles) can use high-precision synchronization products in battery monitoring, control systems, reporting controls, maintenance activities, etc.

The present disclosure is also applicable in industrial markets that include process control systems to help drive productivity, energy efficiency, and reliability. In consumer applications, the synchronization circuits discussed above can be used for image processing, auto focus, and image stabilization (e.g., for digital still cameras, camcorders, etc.). Other consumer applications include audio and video processors for home theater systems, DVD recorders, and high-definition televisions. Yet other consumer applications involve advanced touch screen controllers (e.g., for any type of portable media device). Hence, such technologies can readily be part of smartphones (such as iPhones and Android devices), tablets (such as iPads, Microsoft Surfaces, and Amazon Kindles), security systems, personal computers (PCs), gaming technologies, virtual reality, simulation training, etc.

In certain example implementations, the synchronization functions can be implemented by logic (e.g., embedded logic provided in an application-specific integrated circuit (ASIC), instructions for a DSP, software [whether object code and source code]) encoded in one or more tangible, non-transitory media to be executed by a processor, ASIC, DSP, or other similar machine. In another example, the synchronization activities outlined herein are implemented with fixed logic or programmable logic (e.g., software/computer instructions executed by a processor). Further, the elements identified herein can be implemented by a programmable processor, programmable digital logic (e.g., an FPGA, an EPROM, an EEPROM) or an ASIC that includes digital logic, software, code, electronic instructions, or any suitable combination thereof. The non-transitory medium can be a compact disk, a digital versatile disk, a Blu-Ray disk, a jump drive, or other media.

The logic can also be implemented in a transitory medium, such as a propagating wave, a telecommunications line, or as software itself.

The software processed by the processor(s) can also be executed as an executable file installed by an installation program that has been downloaded and executed. Thus, the software executed might not be the same as the software downloaded. Accordingly, a server can store software that, when executed, causes a computer to install an executable file that, upon its execution, executes the operations of the present disclosure.

With the examples provided above, interactions have been described in terms of two, three, or more elements for purposes of clarity and example only. In certain cases, one or more of the functionalities of a given set of flows were described by only referencing a limited number of network elements. The system architecture and its features are scalable and further can accommodate a large number of components, as well as more complicated or sophisticated arrangements and configurations. Accordingly, the examples provided should not limit the scope or inhibit the features of system architecture as applied to a myriad of other architectures.

The previously described activities illustrate only some of the possible processing scenarios and patterns that can be executed by, or within, the system architecture. Some of these operations can be deleted or removed where appropriate, or these operations can be modified or changed considerably without departing from the scope of the present disclosure. In addition, a number of these operations have been described as being executed concurrently with, or in parallel to, one or more additional operations. However, the timing of these operations can be altered considerably. The preceding operational flows have been offered only for purposes of example and discussion. Substantial flexibility can be provided by the system architecture in that any suitable arrangement, chronology, configuration, and timing mechanism can be provided without departing from the present disclosure.

Numerous other changes, substitutions, variations, alterations, and modifications can be ascertained by one skilled in the art. It is intended the present disclosure encompasses all such changes, substitutions, variations, alterations, and modifications as falling within the scope of the appended claims. To assist the United States Patent and Trademark Office (USPTO) and, additionally, any readers of any patent issued on this disclosure in interpreting the claims appended hereto, Applicant wishes to note the Applicant: (a) does not intend any of the appended claims to invoke 35 U.S.C. section 112(f) as it exists on the date of the filing hereof unless the words "means for" or "step for" are specifically used in the particular claims; and (b) does not intend, by any statement in the specification, to limit this disclosure in any way that is not otherwise reflected in the appended claims.

The invention claimed is:

1. A method to synchronize a clock of a slave device to a clock of a master device, the method comprising:
receiving a first message;
extracting a first time from the first message;
receiving a second message and a third message;
determining a second time that indicates a reception of the second message;
extracting a third time from the third message;
determining a first difference between the first time and the third time;
determining a second difference between the second time and the first time; and
adjusting a frequency of the clock of the slave device, based on the first difference and the second difference, to synchronize with the clock of the master device.

2. The method according to claim 1, further comprising:
receiving a fourth message prior to the first message;
determining a fourth time that indicates a reception of the fourth message;
determining a third difference, based on the first message and the fourth message; and
adjusting a time of the clock of the slave device, based on the third difference.

3. The method according to claim 2, wherein the fourth message is a Sync message, and the fourth time is a SyncEventIngressTimestamp.

4. The method according to claim 1, further comprising:
determining a rate ratio, based on the first difference, the second difference, and a previous rate ratio; and
adjusting the frequency of the clock of the slave device, based on the rate ratio.

5. The method according to claim 1, further comprising:
determining a rate ratio, based on the second difference; and
adjusting the frequency of the clock of the slave device, based on the rate ratio.

6. The method according to claim 5, wherein the rate ratio is decreased if the second difference is greater than zero.

7. The method according to claim 1, wherein the first message is a FollowUp message, the second message is a Sync message, the third message is a FollowUp message, the first time is a time indicated in a preciseOriginTimestamp, the second time is a SyncEventIngressTimestamp, and the third time is a time indicated in a preciseOriginTimestamp.

8. An apparatus to synchronize a clock of a slave device to a clock of a master device, the apparatus comprising:
at least one interface that receives a first message, a second message, and a third message; and
at least one processor that extracts a first time from the first message, determines a second time that indicates a reception of the second message, and extracts a third time from the third message, wherein
the at least one processor is configured to determine a first difference between the first time and the third time, to determine a second difference between the second time and the first time, and to adjust a frequency of the clock of the slave device, based on the first difference and the second difference, to synchronize with the clock of the master device.

9. The apparatus according to claim 8, wherein the at least one interface receives a fourth message prior to the first message, the at least one processor determines a fourth time that indicates a reception of the fourth message, and the at least one processor is further configured to determine a third difference, based on the first message and the fourth message, and to adjust a time of the clock of the slave device, based on the third difference.

10. The apparatus according to claim 9, wherein the first message is a FollowUp message, the second message is a Sync message, the third message is a FollowUp message, the first time is a time indicated in a preciseOriginTimestamp, the second time is a SyncEventIngressTimestamp, the third time is a time indicated in a preciseOriginTimestamp, the fourth message is a Sync message, and the fourth time is a SyncEventIngressTimestamp.

11. The apparatus according to claim 8, wherein the at least one processor is further configured to determine a rate ratio based on the first difference, the second difference, and a previous rate ratio, and to adjust the frequency of the clock of the slave device, based on the rate ratio.

12. The apparatus according to claim 8, wherein the at least one processor is further configured to determine a rate ratio, based on the second difference, and to adjust the frequency of the clock of the slave device, based on the rate ratio.

13. The apparatus according to claim 12, wherein the rate ratio is decreased if the second difference is greater than zero.

14. The apparatus according to claim 12, wherein the rate ratio is increased if the second difference is less than zero.

15. An apparatus to synchronize a clock of a slave device to a clock of a master device, the apparatus comprising:
externally interfacing means for receiving a first message, a second message, and a third message; and
processing means for extracting a first time from the first message, for determining a second time that indicates a reception of the second message, and for extracting a third time from the third message, wherein the processing means determines a first difference between the first time and the third time, determines a second difference between the second time and the first time, and adjusts a frequency of the clock of the slave device, based on the first difference and the second difference, for synchronizing with the clock of the master device.

16. The apparatus according to claim 15, wherein the externally interfacing means receives a fourth message prior to the first message, the processing means determines a fourth time that indicates a reception of the fourth message, determines a third difference, based on the first message and the fourth message, and adjusts a time of the clock of the slave device, based on the third difference.

17. The apparatus according to claim 15, wherein the processing means determines a rate ratio, based on the first difference, the second difference, and a previous rate ratio, and adjusts the frequency of the clock of the slave device, based on the rate ratio.

18. The apparatus according to claim 15, wherein the processing means determines a rate ratio, based on the second difference, and adjusts the frequency of the clock of the slave device, based on the rate ratio.

19. The apparatus according to claim 18, wherein the rate ratio is decreased if the second difference is greater than zero.

20. The apparatus according to claim 18, wherein the rate ratio is increased if the second difference is less than zero.

* * * * *